Figure 1:
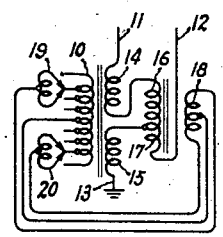

Sept. 21, 1943.   A. N. GARIN   2,330,043

VOLTAGE CONTROL MEANS

Filed July 19, 1941

Inventor:
Alexis N. Garin,
by Harry E. Dunham
His Attorney.

Patented Sept. 21, 1943

2,330,043

UNITED STATES PATENT OFFICE 2,330,043

VOLTAGE CONTROL MEANS

Alexis N. Garin, Pittsfield, Mass., assignor to General Electric Company, a corporation of New York Application July 19, 1941, Serial No. 403,139

21 Claims. (Cl. 171—119)

This invention relates to voltage control in electric power circuits and has for an object the production of a more reliable and more economical transformer means for such service.

A well-known way of regulating or controlling the voltage of a given circuit is to connect it with another available circuit through a transformer which has taps in at least one of its windings and which has tap-changing means to adjust or modify the voltage ratio of the respective circuit terminals of the transformer so as to secure the desired increment (positive or negative) of voltage for the given circuit from that of the available circuit.

In the higher voltage systems, it is found more advantageous to produce a voltage corresponding to the desired voltage increment in an auxiliary relatively low potential winding and then transform it into a more highly insulated winding for connection in series with the relatively high potential circuit. The doubling of the steps of transformation and of the number of transformers in this arrangement naturally involves a corresponding increase in cost and losses, offsetting thereby at least partially the benefits of the scheme.

Various methods of interconnection of windings and tap-changing equipments have been utilized in the past for this purpose, a pertinent system of this kind being that disclosed in Patent 1,959,153, granted May 15, 1934, on an application of L. F. Blume and assigned to the assignee of the present application. These various schemes, though capable of accomplishing the same voltage control, differ considerably in cost and efficiency for the same reliability or they differ considerably in reliability for the same cost and efficiency. As the cost, reliability and efficiency of such equipment are functions of the potential stresses of its various parts, as well as the effective use made of its windings, it is a particular object of this invention to reduce these stresses to lower values than have existed heretofore and especially to reduce the voltage stresses at those points where such reductions are most advantageous while at the same time maintaining maximum utilization of the current capacities of the winding elements and optimum flux conditions of the magnetic cores. These results are accomplished by a novel arrangement of parts.

The invention is particularly useful when the voltages of two circuits of normally different voltage ratings are to be controlled in opposite directions simultaneously. This control may be either a magnitude control in which the voltage of one circuit increases when the voltage of the other circuit decreases or it may be a phase angle control in which the phase angle of the voltage of one circuit advances while the phase of the voltage of the other circuit is retarded. Furthermore, these changes may be made in different proportions in the two circuits. These results may be all accomplished with the use of but one set of ratio adjusters or tap changers. Other advantages of the invention will be evident as the description progresses.

The invention will be better understood from the following description taken in connection with the accompanying drawing and its scope will be pointed out in the appended claims.

Figures 2, 3:
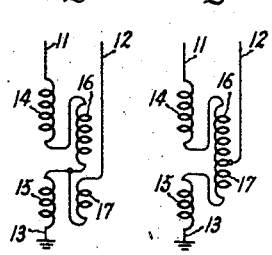
Figure 4:
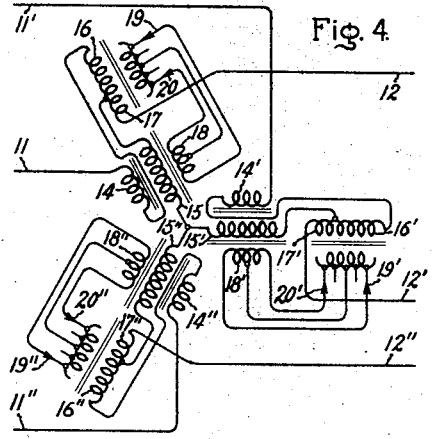
Figure 5:
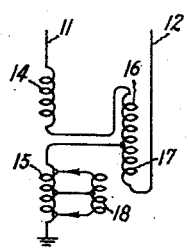
Figure 6:
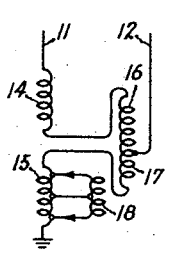
Figure 7:
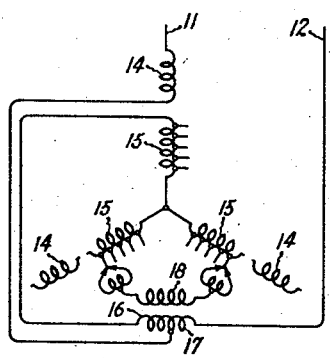
Figure 8:
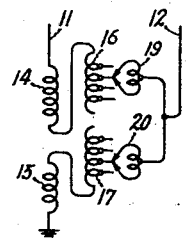
Figures 9, 10, 11:
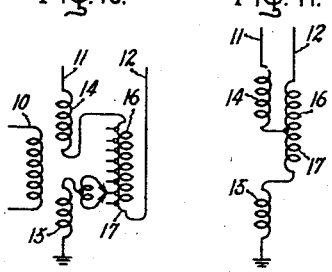

In the drawing Fig. 1 illustrates diagrammatically a preferred arrangement of windings for the control of the magnitude of the voltages of two single-phase circuits in opposite directions, Figs. 2 and 3 are modifications for producing the same direction of simultaneous magnitude control of the voltages of two circuits, Fig. 4 illustrates an extension of Fig. 1 to a three-phase system, Fig. 5 is another modification of Fig. 1 for obtaining the same operation with a lesser number of parts, Fig. 6 is a corresponding modification of Fig. 3, Fig. 7 illustrates an application of the invention to a three-phase system in which the phase angle of one circuit is advanced while simultaneously the phase angle of the other circuit is retarded, Fig. 8 is a modification of Fig. 7 which utilizes a fewer number of parts, Figs. 9 and 10 illustrate further modifications in which all the windings are on one core and different tap-changing equipment is employed, and Fig. 11 is a still further modification of Fig. 1 which is especially useful in circuits having a predetermined voltage ratio in relation to predetermined degrees of desired voltage change therein.

Referring now to the drawing and more particularly to Fig. 1, there is shown therein an available source of voltage in the form of a winding 10 which may be excited in any suitable manner, either conductively by connection to an external source of voltage (not shown) or inductively by transformer action from one of the other windings of the system. This source of voltage 10 is to be used to control simultaneously and in opposite directions the voltages of a pair of circuits 11 and 12 which are shown as having a common return or neutral 13. Ordinarily, the voltage of the source 10 will be relatively low compared with the voltages of the circuits 11 and 12. The voltages of the circuits 11 and 12 are normally substantially different from each other by reason of a series winding 14 which is connected in the circuit 11 exclusively. This winding may be arranged so as to either boost or buck the voltage of the circuit 11. Ordinarily, it will be a boosting winding so that the voltage of circuit 11 is normally substantially higher than the voltage of circuit 12.

The principal component of the voltages of the circuits 11 and 12 is produced by a common winding 15 which constitutes the common winding of an autotransformer whose series winding is the winding 14. These two main windings are therefore mounted on the same core and together they constitute a main transformer. The winding 10 is also preferably, although not necessarily, mounted on the same core with the windings 14 and 15.

If the system thus far described is energized by connecting a source of voltage across the winding 10, this winding constitutes the primary winding of the main transformer. The principal voltage of circuit 12 will be the voltage of winding 15 and the principal voltage of circuit 11 will be the voltage of windings 15 and 14 in series. If the main transformer is excited by applying a source of voltage between the common terminal 13 and either circuit 11 or circuit 12, winding 10 will be a tertiary winding, and the windings 14 and 15 will constitute an autotransformer as before, the winding 15 being the primary winding if the source of voltage is applied to the circuit 12 and being the secondary winding if the source of voltage is applied to the circuit 11.

For regulating or controlling the difference between the voltages of circuits 11 and 12 there is provided an auxiliary or series transformer having a pair of interconnected secondary windings 16 and 17 and a common primary winding 18. The winding 16 is connected between the windings 14 and 15, and the winding 17 is connected between the winding 15 and the circuit 12.

The auxiliary windings 16 and 17 may either be a single winding provided with an intermediate tap which is connected to the upper terminal of the winding 15 or they may be separate windings each having one terminal connected to the upper terminal of winding 15. They may have the same number of turns or a different number of turns, the latter case being illustrated. Their direction of winding or the polarity of their connections or both may be such that their voltages are in the same or opposite directions, it being assumed for the present that their voltages are in the same direction with respect to each other so that their directions or polarities are opposite with respect to the voltages of circuits 11 and 12.

For simultaneously varying the voltages of windings 16 and 17 the terminals of the winding 18 are connected respectively to tap-changing equipments 19 and 20 which co-operate with taps provided in the winding 10. It is preferable, although not necessary, permanently to interconnect the electrical mid-points of windings 10 and 18. The tap changers may be of conventional double finger construction, each double finger tap changer being provided with a mid-tapped switching reactor for preventing circuit interruption during a tap-changing operation and for permitting operation on bridging or half-cycle positions of the tap-changing equipments. They may be operated simultaneously by any suitable driving mechanism in such a manner that they always move in opposite directions. In this manner, as they move toward the mid-point of the winding 10 smaller and smaller voltages are impressed on the winding 18 and correspondingly smaller and smaller voltage increments will be introduced into the circuits 11 and 12 by the windings 16 and 17. When the tap changers 19 and 20 are at the mid-point, zero voltage is introduced in the windings of the auxiliary transformer and the equipment is said to be in its neutral position. When the movable contacts are moved further to the opposite sides of the mid-point the excitation of the auxiliary transformer is reversed, thereby reversing the voltages of the windings 16, 17 and 18 and thus the voltage increments introduced into the circuits 11 and 12 are reversed so that if the incremental voltage raised the circuit voltage in the first place it will now depress it and vice versa.

As it has been assumed that windings 16 and 17 are wound in the same direction, like two portions of one continuous winding, and if the entire circuit is energized by applying voltage from any suitable source across the winding 10, it will be seen that when the voltage of winding 16 raises the voltage of circuit 11, winding 17 will depress the voltage of circuit 12 whereby the voltages of circuits 11 and 12 will be changed in opposite directions simultaneously.

If, on the other hand, the system is energized by applying voltage to circuit 11 or circuit 12, then whichever circuit is so energized will have its voltage fixed and it will be independent of the position of the tap-changing means, the voltage change in the other circuit then being the entire voltage change in the windings 16 and 17.

As there is no break between the windings 16 and 17, it will be seen that the maximum voltage stress between them is exactly equal to the algebraic sum of the voltages induced in them, and that this is the minimum possible value for it. The general level of the potential stress between winding 18 and the other windings, 16 and 17, on the same core is limited by the lower-potential circuit 12. This is particularly true when the voltages contributed by windings 16 and 17 are a small fraction of those of windings 15 and 14. The maximum voltage stress across the windings of the circuit 11 is its own voltage. The voltage across the break between the windings 14 and 15 is the voltage of the winding 16 which is generally of the order of 10–20 per cent of that of circuit 11.

Assuming that the system of Fig. 1 is excited by applying voltage across winding 10 and that this voltage is a constant and that it is required to vary the voltage of circuit 11 between the maximum and minimum values $V_{11}$ max. and $V_{11}$ min., and that of circuit 12 between the maximum and minimum values $V_{12}$ max. and $V_{12}$ min., the maximum of one circuit being simultaneous with the minimum of the other and vice versa, then according to the present invention the windings 14, 15, 16 and 17 are constructed for the following voltages between their terminals:

$$V_{14} = \frac{V_{11} \text{ max.} + V_{11} \text{ min.}}{2} - V_{15} \qquad (1)$$

$$V_{15} = \frac{V_{12} \text{ max.} + V_{12} \text{ min.}}{2} \qquad (2)$$

$$V_{16} \text{ max.} = \frac{V_{11} \text{ max.} - V_{11} \text{ min.}}{2} \qquad (3)$$

$$V_{17} \text{ max.} = \frac{V_{12} \text{ max.} - V_{12} \text{ min.}}{2} \qquad (4)$$

If winding 10 is not energized from an external source, but is excited by induction from circuit 11 or 12, then that circuit—11 or 12—acts as primary and the absolute value of its voltage is beyond control, although the relative values of circuits 11 and 12 are still controlled as before. In this case, an important advantage of the scheme of the present invention is that the flux density in the core of the main transformer can be maintained more nearly constant while the absolute values of the voltages in circuits 11 and 12 vary, one naturally, the other by control.

In the modification shown in Fig. 2 the connections of the winding 17 have been reversed. In this manner the voltages of the circuits 11 and 12 may be simultaneously controlled in the same direction. In this figure the windings 10 and 18 have been omitted for the sake of simplicity, although it will, of course, be understood that in actual practice these windings or their equivalent will be present. It will also be understood that the change produced by Fig. 3 is primarily the result of the change in the relative polarities of the windings 16 and 17 so that the same general result could be secured by reversing the connections of the winding 16 instead of the connections of the winding 17 or by reversing the direction of the winding turns of either one of the windings relative to the other.

In Fig. 3 is shown another modification for accomplishing the same result in perhaps a simpler manner by reversing the connections of the winding 17 in another way, namely, by connecting the circuit 12 to the junction between the windings 16 and 17 and connecting the winding 15 to the remaining terminal of the winding 17. In this case the various windings are constructed for the following voltages: $V_{14}$, $V_{15}$ and $V_{17}$ max. are the same as defined above by Formulas 1, 2 and 4, respectively, but $V_{16}$ max. is now different and is defined by $$V_{16} \text{ max.} = \frac{V_{11} \text{ max.} - V_{11} \text{ min.}}{2} - V_{17} \text{ max.} \quad (5)$$

The connection of Fig. 3 can be adapted also to the first service explained in connection with Fig. 1, that is, for voltage control of circuits 11 and 12 in opposite directions, by reversing the direction of winding of either 16 or 17 with respect to the other, or by reversing the connections of one of them into the circuit, as in Fig. 2.

Fig. 4 illustrates the three-phase application of the system illustrated in Fig. 1. It will be seen that Fig. 4 is essentially the repetition of Fig. 1 in each phase of the three-phase system.

The three circuits 11, 11' and 11", as well as circuits 12, 12' and 12", are shown connected in Y, but they could be connected also in delta or other three-phase connection. The circuits 18, 18' and 18" are shown isolated from each other, but they also can be connected in either Y or delta fashion.

The single-phase diagrams of Figs. 2 and 3 also may be extended similarly to a three-phase system.

In the modification shown in Fig. 5 the primary winding 18 of the auxiliary transformer is excited directly from the common winding 15 of the main autotransformer which, therefore, is provided with taps. When this is done winding 10 can be dispensed with, if desired, in which case, however, one of the circuits 11 and 12 must be excited from some available source and function as an input circuit not subject to control by the equipment of Fig. 5 and leaving only the other circuit as an output circuit whose voltage is subject to control by the equipment. In such operation one of the principal benefits of the circuit of Fig. 5 is that as the voltages of circuits 11 and 12 vary, one independently of the equipment and the other dependently thereon, the flux density of the core of the windings 14 and 15 can be kept nearly constant.

Fig. 6 is a modification of Fig. 5 and is of particular value when the voltage of the output circuit is to be raised when the input voltage is higher, and lowered when the input voltage is lower, though to a different extent.

Fig. 7 illustrates an adaptation of the invention to the phase control of two three-phase circuits 11 and 12. The system may receive its energization from a suitable three-phase source connected to the terminals of the tapped winding 10 which in this case, as in Fig. 4, is a three-phase winding. The details of the connections are shown for only one phase of the system so as not to confuse the diagram, as the connections of the other phases will be evident from symmetry and the following description. Considering those windings 16 and 17 for which the connections are shown, the voltages induced in them will be at right angles to those induced in windings 14 and 15 because the winding 18 is energized from a voltage derived from equal portions of two of the leg voltages of winding 10 whereas the windings 16 and 17 are serially connected in the remaining leg of the main transformer. Therefore, the effect of winding 16 on the voltage of circuit 11 and the effect of the winding 17 on that of the circuit 12 are primarily a change of phase angle, advancing one and simultaneously retarding the other when 16 and 17 are wound similarly in direction, and advancing (or retarding) both simultaneously, when 16 and 17 are wound in opposite directions. The ratio of the phase shift in one circuit to that in the other circuit depends upon the relative number of turns in 16 and 17.

The voltages $V_{14}$, $V_{15}$, $X_{16}$ max., and $V_{17}$ max., for which the respective windings are to be constructed, can be calculated by Formulas 1, 2, 3 and 4, respectively, but they should now be interpreted vectorially, as now the important difference between the extreme values of $V_{11}$, that is, $V_{11}$ max. and $V_{11}$ min., is not one of magnitude but of phase angle, $V_{11}$ max. representing, let us say, the most advanced vector value of $V_{11}$, and $V_{11}$ min. the most retarded vector value of $V_{11}$. The same thing is true with respect to $V_{12}$ max. and $V_{12}$ min.

Fig. 8 bears the same relation to Fig. 7 that Fig. 5 does to Fig. 1 in that winding 10 is omitted and the tap changers for controlling the voltage of the winding 18 operate over taps brought out from the main winding 15.

In Fig. 9 the invention is shown carried out by one transformer, that is, by having all the windings on one core. Here the taps are shown on the auxiliary windings 16 and 17. The relative direction of control of the voltages of the two circuits is determined by the relative direction of winding of 16 and 17 and the relative direction of travel of the movable contacts of the tap changers. In any case, it will be seen that the introduction of windings 16 and 17 into the system between 14 and 15 assures minimum potential stresses between windings 16 and 17 and minimum potential stresses between the individual tap changers.

Fig. 10 represents a still further simplification in which a single ratio adjuster and a single switching reactor are utilized. Windings 16 and 17 are connected together permanently as one continuous winding equipped with taps so that a given turn of the winding may belong either to 16 or 17 depending on the tap connection of the ratio adjuster.

Fig. 11 shows an advantageous arrangement of the windings for those cases in which the voltages change required in the lower voltage circuit 12 is greater than that in the higher voltage circuit 11. The voltages $V_{14}$, $V_{15}$ and $V_{16}$ max. remain the same as defined by Formulas 1, 2 and 3, respectively, but $V_{17}$ max. is changed so as to become $$V_{17} \text{ max.} = \frac{V_{12} \text{ max.} - V_{12} \text{ min.}}{2} - V_{16} \text{ max.} \quad (6)$$

As in Fig. 2, windings 10 and 18 have been omitted from Figs. 3 and 11 for the sake of simplicity but it will be understood that in practice they will be present.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a pair of alternating current circuits, transformer means comprising a pair of main windings on a common core leg and a pair of auxiliary windings, one main winding and one auxiliary winding being serially connected in one circuit, the remaining two windings being serially connected in the other circuit, a point on each of said auxiliary windings being directly interconnected, and means for simultaneously varying the voltage of said auxiliary windings so as simultaneously to vary the voltage of both of said circuits.

2. In combination, a pair of alternating current circuits, transformer means comprising a pair of main windings on a common core and a pair of auxiliary windings, one main winding and one auxiliary winding being serially connected in one circuit, the remaining two windings being serially connected in the other circuit, a point on each of said auxiliary windings being directly interconnected, and means for simultaneously varying the voltage of said auxiliary windings in such a way that the magnitude of the voltage of said circuits is oppositely varied.

3. In combination, a pair of alternating current circuits, transformer means comprising a pair of main windings on a common core and a pair of auxiliary windings, one main winding and one auxiliary winding being serially connected in one circuit, the remaining two windings being serially connected in the other circuit, a point on each of said auxiliary windings being directly interconnected, and means for simultaneously varying the voltage of said auxiliary windings in such a way that the phase of the voltage of said circuits is oppositely varied.

4. In combination, a pair of alternating current circuits, transformer means comprising a pair of main windings and a pair of auxiliary windings, one of said main windings and one of said auxiliary windings being serially connected across one of said circuits, both of said main windings and the remaining auxiliary winding being serially connected across the other of said circuits with said remaining auxiliary winding between them, said main windings having a common core leg and said auxiliary windings having a common core leg, and means for simultaneously varying the voltage of said auxiliary windings so as simultaneously to vary the voltage of both of said circuits.

5. In combination, a pair of alternating current circuits, transformer means comprising a pair of main windings and a pair of auxiliary windings, one of said main windings and one of said auxiliary windings being serially connected across one of said circuits, both of said main windings and the remaining auxiliary winding being serially connected across the other of said circuits with said remaining auxiliary winding between them, said main windings having a common core and said auxiliary windings having a common core, and means for simultaneously varying the voltage of said auxiliary windings in such a way that the magnitude of the voltage of said circuits is oppositely varied.

6. In combination, a pair of alternating current circuits, transformer means comprising a pair of main windings and a pair of auxiliary windings, one of said main windings and one of said auxiliary windings being serially connected across one of said circuits, both of said main windings and the remaining auxiliary winding being serially connected across the other of said circuits with said remaining auxiliary winding between them, said main windings having a common core and said auxiliary windings having a common core, and means for simultaneously varying the voltage of said auxiliary windings in such a way that the phase of the voltage of said circuits is oppositely varied.

7. In an electrical system, transformer means for controlling the voltage relationship of two circuits, said means comprising two fixed main windings on the same core leg, and two fixed auxiliary windings adapted to deliver variable voltages, both of said main windings and at least one of said auxiliary windings being included in one of said circuits, and one of said main windings and one of said auxiliary windings being included in the other circuit, both of said auxiliary windings being connected into the system at a point between said two main windings.

8. In an electrical system, in combination, transformer means for controlling the voltage relationship of two circuits, said means comprising two fixed main windings on the same core leg and two fixed auxiliary windings, both of said main windings and at least one of said auxiliary windings being included in one of said circuits, one of said main windings and one of said auxiliary windings being included in the other of said circuits, both of said auxiliary windings being connected into the system at a point between said two main windings, and means for simultaneously varying the voltages of said auxiliary windings.

9. Transformer means for controlling the electrical relationship of a first and a second circuit having normally different and variable voltages comprising, in combination, a first main winding adapted to furnish said first circuit with a voltage corresponding to the average value of the voltage range of that circuit, a second main winding which in combination with said first main winding is adapted to furnish a voltage to said second circuit corresponding to the average value of the voltage range of said second circuit, said second main winding being on the same core leg as said first main winding, an auxiliary winding adapted to deliver a variable voltage and connected between said first main winding and said first circuit in series relationship therewith, and a second auxiliary winding adapted to deliver a variable voltage and connected between said two main windings in series relationship therewith, all of said windings being fixed relative to each other.

10. In an electrical system, transformer means for controlling the electrical relationship of two circuits, said means comprising two main windings on the same core leg, two auxiliary windings, and tap-changing means for varying the terminal voltages of said auxiliary windings, at least one of said auxiliary windings and both of said main windings being arranged in series relationship across one of said circuits, and the other auxiliary winding and one of said main windings being arranged in series relationship across the other circuit, both of said auxiliary windings being connected into the system between said two main windings.

11. In an electrical system, means for simultaneously controlling the voltages of two circuits in opposite directions, said means comprising a main transformer including a plurality of main windings and taps on one of said windings, an auxiliary transformer including an exciting winding and two series windings, tap-changing means for connecting said exciting winding selectively to said taps to produce correspondingly different voltages in said series windings, two of said main windings and at least one of said series windings being included in one of said circuits and one of said main windings and one of said series windings being included in the other of said circuits, said series windings being connected into the system between said two main windings and with such polarities as to add a voltage to one of said circuits and simultaneously subtract a voltage from the other of said circuits.

12. Voltage-control means as in claim 11, in which said auxiliary windings raise the voltage of one of said circuits and simultaneously lower the voltage of the other circuit.

13. Voltage-control means as in claim 11, in which said auxiliary windings advance the phase of one of said circuits and simultaneously retard the phase of the other circuit.

14. In combination, a pair of alternating current circuits, a main transformer having a pair of main windings, an auxiliary transformer having a pair of auxiliary windings, said auxiliary windings being connected directly in series with each other, one of said main windings being connected across one of said circuits in series with at least one of said auxiliary windings, said last mentioned main winding being connected across the other of said circuits in series with at least a different one of said auxiliary windings and the remaining main winding with the auxiliary winding between said main windings, there being but one auxiliary winding in one of said circuits, and means for simultaneously varying the voltage of said auxiliary windings so as simultaneously to vary the voltage of both of said circuits.

15. In combination, a transformer having a pair of main windings on the same core leg and a pair of auxiliary windings, all four of said windings being fixed relative to each other, a circuit including one of said main windings and one of said auxiliary windings in series, another circuit including both main windings plus the remaining auxiliary winding in series, means for directly interconecting said auxiliary windings, and means for simultaneously varying the voltage of said auxiliary windings.

16. In combination, a transformer having at least three windings on the same core leg, a pair of circuits having a common side connected to a terminal of one of said windings, the remaining windings being serially connected between the remaining sides of said circuits, taps on one of the remaining windings, and means for selectively connecting the remaining side of the first mentioned winding to said taps.

17. In an electrical system comprising a network of circuits, transformer means for simultaneously controlling the voltage of two of said circuits, said means comprising two main windings on the same core leg and two auxiliary windings for delivering variable voltages, both of said main windings and at least one of said auxiliary windings being included in one of said two circuits and one of said main windings and one of said auxiliary windings being included in the other of said two circuits, each of said auxiliary windings having a terminal connected to said network of circuits intermediate said two main windings.

18. In combination, a pair of alternating-current circuits, a main transformer having a pair of main windings, a separate transformer having a pair of auxiliary windings, said auxiliary windings being connected directly in series with each other, one of said main windings being connected across one of said circuits in series with one only of said auxiliary windings, said last-mentioned main winding being connected across the other of said circuits in series with the remaining main winding and the remaining auxiliary winding to the exclusion of the first-mentioned auxiliary winding with said remaining auxiliary winding between said main windings, and means for simultaneously varying the voltage of said auxiliary windings so as simultaneously to vary the voltage of both of said circuits.

19. In combination, a transformer system having two main windings and two auxiliary windings, a pair of alternating-current circuits, means in addition to said circuits for exciting said windings, and means for simultaneously varying the effective voltages of said auxiliary windings, each of said auxiliary windings being so interconnected as to have two respective points always at substantially the same potential, both of said main windings and at least one of said auxiliary windings being connected in series in one of said circuits with said last-mentioned auxiliary winding electrically between said main windings, only one of said main windings and at least the other of said auxiliary windings being connected in series in the other of said circuits.

20. In combination, a main transformer having a pair of windings, an auxiliary transformer having a pair of windings, means exclusive of its said two windings for exciting said main transformer, means exclusive of its said two windings for variably exciting said auxiliary transformer, and a pair of circuits whose voltages are determined by combinations of the voltages induced in certain of said windings, both of the windings of said main transformer and at least one of the windings of said auxiliary transformer being connected in one of said circuits with said last-mentioned winding of said auxiliary transformer connected between the windings of said main transformer, one of the windings of said main transformer and at least the other of the windings of said auxiliary transformer being connected in the other of said circuits, each of the windings of said auxiliary transformer having a terminal which is directly connected to the other so that the two always have substantially the same potential.

21. In combination, a main transformer having a tapped primary winding and two secondary windings, a series transformer having an exciting winding and two serially connected secondary windings, a circuit including both secondary windings of said main transformer and one secondary winding of said series transformer connected in series with said last-mentioned series transformer winding connected between the secondary windings of said main transformer, a second circuit including one only of the secondary windings of said main transformer and the remaining one only of the secondary windings of said series transformer connected in series, and means including tap-changing means cooperating with the taps of the primary winding of said main transformer for varying the voltage of said exciting winding of said series transformer so as simultaneously to vary the voltage of both of said circuits.

ALEXIS N. GARIN.